UNITED STATES PATENT OFFICE.

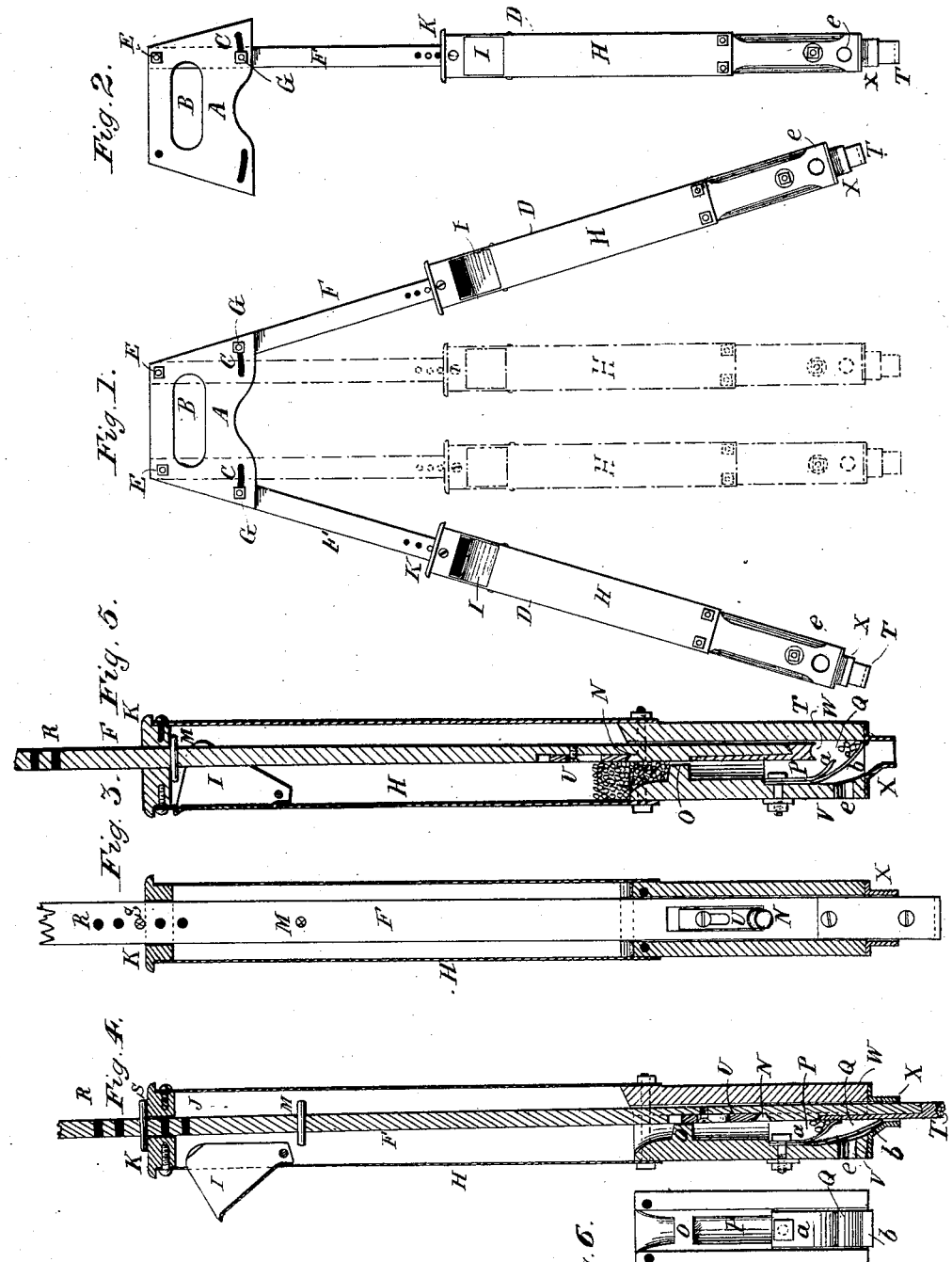

HARRISON OGBORN, OF RICHMOND, INDIANA, AND TUNIS T. KENDRICK, OF NEW YORK, N. Y.

IMPROVEMENT IN HAND CORN-PLANTERS.

Specification forming part of Letters Patent No. 162,493, dated April 27, 1875; application fi'ed April 13, 1875.

*To all whom it may concern:*

Be it known that we, HARRISON OGBORN, of Richmond, in the county of Wayne and State of Indiana, and TUNIS T. KENDRICK, of the city, county, and State of New York, have invented certain new and useful Improvements in Hand Corn-Planters; and we hereby declare the following to be a full, clear, and exact description of the same, reference being had to the accompanying drawings, making a part of this specification, in which—

Figure 1 is a side elevation of a device embodying the improvements of our invention. Fig. 2 is an elevation, showing one of the planters removed. Fig 3 is a vertical section of one of the planters, showing a front elevation of the plunger. Fig. 4 is a vertical section of one of the planters, showing a transverse sectional view of the plunger and other operating parts, the plunger being driven out at the lower end of the planter. Fig. 5 is a sectional view of one of the planters, showing the plunger in a transverse section and drawn up within the upper grain-chamber, to permit the corn to drop from the upper grain chamber to the lower one and to permit the seed-cup to be again filled; and Fig. 6 is a detached view of the lower front section of one of the planters, showing the partition which divides the receiver from the upper grain-chamber, and the springs forming the bottoms of the upper and lower grain-chambers.

This invention relates to an improvement in that class of hand corn-planters in which two or more hand corn-planters are operated by a single handle; and it consists, first, of two or more hand corn-planters, adjustably secured to a single handle, adapted to be operated in such a manner as to plant two or more hills of corn in a single row, at one and the same time. Secondly, it consists of a curved lateral spring, located within the grain-tube so as to divide it into an upper and a lower chamber, in combination with the plunger containing the seed-cup, for the purposes of receiving the corn as it falls from the seed-cup, and retaining it until the plunger has accomplished its downward stroke, and has been again drawn up to refill the seed-cups. Thirdly, it consists of two curved lateral springs, secured one above the other, within the grain-chamber, so as to divide it into an upper and a lower chamber, in combination with the plunger containing the seed-cup, for the purposes of receiving the corn as it falls from the seed-cup and retaining it in the upper chamber until the plunger has completed its downward stroke and has been drawn up to permit the seed-cup to be refilled, and then permitting the corn to drop from the upper to the lower chamber, where it will be retained until driven out by the next downward stroke of the plunger. Fourthly, it consists of a hinged hopper in one of the sides of the planter, and having its inner upper edges flared to engage with vertical indentations made in the opposite adjacent parallel sides of the receiver.

In the accompanying drawings, A is the handle, having a hand-hole, B, near its top, and longitudinal slots C C in its opposite lower corners. D D are two hand corn-planters secured to the handle A by the bolts E E passed through the upper ends of the plungers F F, at its upper opposite corners, and the bolts G G passed through the plunger F F and slots C C in its opposite lower corners, so as to render the planters D D adjustable, as shown in Fig. 1. An extra handle, A, is provided, and one of the planters D D may be detached and secured to the extra handle, as shown in Fig. 2. The receiver H is of sheet metal, provided near its upper end with the hinged hopper I, having its inner upper edges flared to engage, when closed, with the vertical indentations J made in the opposite adjacent parallel sides of the receiver. The top of the receiver is provided with a fixed cap, K, having a central rectangular opening for the passage of the plunger F. The plunger F is provided with a fixed internal peg, M, which is so located as to permit the seed-cup N to be drawn just far enough above the partition O which separates the receiver from the grain-chambers P and Q to permit the seed-cup N to be filled. The plunger F is also provided with a series of holes, R, for the reception of the pin S, for regulating the depth to which the lower end of the plunger may be driven into the ground below the bottom of the planter. The lower portion of the plunger F is provided with a combined toe and face plate, T, which prevents it from being worn. The seed-cup N consists of a recess made in the front of the plunger F, and provided with a slotted adjustable plate, U, so that the quantity of corn to be planted in one hill may be regulated as desired. The lower portion of the stock of the planter is of wood, made in two vertical portions, V W, secured to the lower end of the sheet-metal receiver H, and further secured together by the metal toe-plate X, at their lower ends. The curved lateral springs $a$ and $b$ are secured to the front section V of the lower portion of the stock of the planter, and divide the grain-chamber into an upper chamber, P, and a lower chamber, Q.

The point of the lower spring $b$, when there is no pressure upon it, rests against the rear vertical wall of the toe-plate X, and when pressed back by the plunger F it rests against the beveled wall of the toe-plate X. A hole, $e$, is made in the front portion V of the stock of the planter, to permit the dirt which may work up behind the spring $b$ to be forced out through it, and thus permit the spring $b$ to work properly. The hinged hopper I has its outer or front upper edge flared, to furnish a means for grasping it to open it. The hopper being opened, as in Fig. 4, the corn is poured in and the hopper closed, as in Fig. 5, the inner flaring edges engaging with the vertical indentations J, retaining it in place. The plunger F is then drawn up, as in Fig. 5, when the seed-cup N will immediately fill with corn. The plunger F is then driven down by pressing upon the handle A, and the seed-cup N with its contents is carried below the partition O, where the corn falls from the seed-cup, and lodges upon the upper spring $a$, Fig. 4, where it is retained until the plunger F has completed its downward stroke, and has been again drawn up to permit the seed-cup to be refilled, when the corn will fall from the spring $a$ to the lower spring $b$, Fig. 5, and there remain until driven out by the next descending stroke of the plunger F. Without the spring $a$ it would be a question variedly determined whether the corn would fall out before the spring $b$ closed the discharged orifice, or whether this orifice would be first closed and the corn driven out by the plunger; but with the spring $a$ there can be no uncertainty, as it is positive in its action, and insures the operation of lodging the corn upon the spring $b$, where it will be retained until driven out by the plunger F. Two planters have been heretofore used upon a single frame or handle, to plant two hills of corn at one time in two different rows, but by providing the handle A the planters D D are adjustably secured, to regulate the distance between the hills, and the implement is taken in one hand and two hills of corn planted in a single row at one time. An implement of this construction may be taken in each hand, and four hills planted in two rows, or one of the planters may be detached from the handle and attached to a separate handle and two rows checked off at one time. A one-armed person would be unable to use the straddle-row planters, while he would experience no difficulty whatever in using one constructed as herein described. The adjustability of the plate U of the seed-cup permits the quantity of corn to be deposited in each hill to be regulated at will, the hopper I in the side of the receiver obviates the necessity of having a removable cap, and the series of holes R and the pin S provide a means of regulating the depth to which the corn may be planted.

Having thus described our invention of improvements, what we claim as new and useful, and desire to secure by Letters Patent, is—

1. Two or more hand corn-planters, adjustably secured to a handle and arranged to plant two or more hills of corn in a single row at one and the same time, substantially as described.

2. The curved lateral spring $a$, located within the grain-tube of a corn-planter, and dividing it into an upper and a lower chamber, in combination with a plunger, F, having a seed-cup, N, substantially as and for the purposes set forth.

3. The curved lateral springs $a\ b$, secured one above the other, within the grain-tube of a corn-planter, in combination with the plunger F, having the seed-cup N, substantially as and for the purposes set forth.

4. In a hand corn-planter, the hinged hopper I, provided with the inner upper flaring edges, in combination with the vertical indentations J, substantially as and for the purposes set forth.

HARRISON OGBORN,
TUNIS T. KENDRICK.

Witnesses:
W. E. BELL,
THEODORE MUNGEN.